US012210491B2

(12) United States Patent
Ackner et al.

(10) Patent No.: US 12,210,491 B2
(45) Date of Patent: *Jan. 28, 2025

(54) INFERRING A DATASET SCHEMA FROM INPUT FILES

(71) Applicant: Palantir Technologies Inc., Denver, CO (US)

(72) Inventors: Nir Ackner, Palo Alto, CA (US); Eric Lin, Palo Alto, NY (US)

(73) Assignee: Palantir Technologies Inc., Denver, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 18/438,301

(22) Filed: Feb. 9, 2024

(65) Prior Publication Data
US 2024/0184754 A1 Jun. 6, 2024

Related U.S. Application Data (63) Continuation of application No. 16/748,351, filed on Jan. 21, 2020, now Pat. No. 11,907,181, which is a (Continued)

(51) Int. Cl.
*G06F 16/21* (2019.01)
*G06F 3/06* (2006.01)
*G06F 40/205* (2020.01)

(52) U.S. Cl.
CPC .......... *G06F 16/211* (2019.01); *G06F 3/0638* (2013.01); *G06F 40/205* (2020.01)

(58) Field of Classification Search
CPC .... G06F 16/211; G06F 40/205; G06F 3/0638; G06F 16/00; G06F 16/86; Y10S 707/99943
See application file for complete search history.

(56) References Cited

U.S. PATENT DOCUMENTS 5,418,950 A   5/1995   Li et al.
5,428,737 A   6/1995   Li et al.
(Continued)

FOREIGN PATENT DOCUMENTS

DE   102014103482 A1   9/2014
EP   1647908 A2   4/2006
(Continued)

OTHER PUBLICATIONS

Jenks et al., "Nomadic Threads: A Migrating Multithreaded Approach to Remote Memory Accesses in Multiprocessors," Parallel Architectures and Compilation Techniques, 1996, Oct. 20, 1996, pp. 2-11.
(Continued)

*Primary Examiner* — Brittany N Allen
*Assistant Examiner* — William P Bartlett
(74) *Attorney, Agent, or Firm* — Duane Morris LLP (57) ABSTRACT

A method comprises selecting a sample excerpt from a data input file; in response to the determining that a first row in the sample excerpt does not contain a delimited value and a second row does contain a delimited value, determining that the first row consists of header data; identifying one or more jagged rows based on row delimiters that were erroneously placed; causing displaying text that led to creation of a jagged row; receiving an addition or removal of a specific row delimiter to the text; updating the sample excerpt based on the addition or the removal; analyzing the sample excerpt to determine a row delimiter for the data input file; identifying a plurality of rows that is not included in the header data; identifying a plurality of candidate column delimiters and generating a candidate schema for the data input file.

20 Claims, 5 Drawing Sheets

Related U.S. Application Data continuation of application No. 16/210,984, filed on Dec. 5, 2018, now Pat. No. 10,540,333, which is a continuation of application No. 15/654,952, filed on Jul. 20, 2017, now Pat. No. 10,204,119.

(56) References Cited

U.S. PATENT DOCUMENTS

| | | |
|---|---|---|
| 5,428,776 A | 6/1995 | Rothfield |
| 5,608,899 A | 3/1997 | Li et al. |
| 5,613,105 A | 3/1997 | Zbikowski et al. |
| 5,701,456 A | 12/1997 | Jacopi et al. |
| 5,724,575 A | 3/1998 | Hoover et al. |
| 5,794,228 A | 8/1998 | French et al. |
| 5,794,229 A | 8/1998 | French et al. |
| 5,857,329 A | 1/1999 | Bigham |
| 5,911,138 A | 6/1999 | Li et al. |
| 5,918,225 A | 6/1999 | White et al. |
| 6,208,985 B1 | 3/2001 | Krehel |
| 6,236,994 B1 | 5/2001 | Swartz et al. |
| 6,289,334 B1 | 9/2001 | Reiner et al. |
| 6,311,181 B1 | 10/2001 | Lee et al. |
| 6,321,274 B1 | 11/2001 | Shakib et al. |
| 6,643,613 B2 | 11/2003 | Mcgee et al. |
| 6,745,382 B1 | 6/2004 | Zothner |
| 6,801,229 B1 | 10/2004 | Tinkler |
| 6,851,108 B1 | 2/2005 | Syme et al. |
| 6,857,120 B1 | 2/2005 | Arnold et al. |
| 6,877,137 B1 | 4/2005 | Rivette et al. |
| 6,976,024 B1 | 12/2005 | Chavez, Jr. et al. |
| 7,028,223 B1 | 4/2006 | Kolawa et al. |
| 7,085,890 B2 | 8/2006 | Kashyap |
| 7,155,728 B1 | 12/2006 | Prabhu et al. |
| 7,216,133 B2 | 5/2007 | Wu et al. |
| 7,406,592 B1 | 7/2008 | Polyudov |
| 7,519,589 B2 | 4/2009 | Charnock et al. |
| 7,546,353 B2 | 6/2009 | Hesselink et al. |
| 7,610,290 B2 | 10/2009 | Kruy et al. |
| 7,627,489 B2 | 12/2009 | Schaeffer et al. |
| 7,783,679 B2 | 8/2010 | Bley |
| 7,853,573 B2 | 12/2010 | Warner et al. |
| 7,877,421 B2 | 1/2011 | Berger et al. |
| 7,908,521 B2 | 3/2011 | Sridharan et al. |
| 7,979,424 B2 | 7/2011 | Dettinger et al. |
| 8,073,857 B2 | 12/2011 | Sreekanth |
| 8,103,962 B2 | 1/2012 | Embley et al. |
| 8,417,715 B1 | 4/2013 | Bruckhaus et al. |
| 8,429,194 B2 | 4/2013 | Aymeloglu et al. |
| 8,433,702 B1 | 4/2013 | Carrino et al. |
| 8,499,287 B2 | 7/2013 | Shafi et al. |
| 8,560,494 B1 | 10/2013 | Downing et al. |
| 8,639,552 B1 | 1/2014 | Chen et al. |
| 8,799,867 B1 | 8/2014 | Peri-Glass et al. |
| 8,909,597 B2 | 12/2014 | Aymeloglu et al. |
| 8,924,429 B1 | 12/2014 | Fisher et al. |
| 8,935,201 B1 | 1/2015 | Fisher et al. |
| 9,031,981 B1 | 5/2015 | Potter et al. |
| 9,105,000 B1 | 8/2015 | White et al. |
| 9,292,388 B2 | 3/2016 | Fisher et al. |
| 9,330,120 B2 | 5/2016 | Colgrove et al. |
| 9,348,677 B2 | 5/2016 | Marinelli, III et al. |
| 9,378,526 B2 | 6/2016 | Sampson |
| 9,753,928 B1 | 9/2017 | Elmore et al. |
| 2002/0052893 A1 | 5/2002 | Grobler et al. |
| 2002/0184111 A1 | 12/2002 | Swanson |
| 2003/0004770 A1 | 1/2003 | Miller et al. |
| 2003/0023620 A1 | 1/2003 | Trotta |
| 2003/0105833 A1 | 6/2003 | Daniels et al. |
| 2003/0212670 A1 | 11/2003 | Yalamanchi et al. |
| 2004/0088177 A1 | 5/2004 | Travis et al. |
| 2004/0098731 A1 | 5/2004 | Demsey et al. |
| 2004/0103088 A1 | 5/2004 | Cragun et al. |
| 2004/0126840 A1 | 7/2004 | Cheng et al. |
| 2004/0139212 A1 | 7/2004 | Mukherjee et al. |
| 2004/0153837 A1 | 8/2004 | Preston et al. |
| 2004/0193608 A1 | 9/2004 | Gollapudi et al. |
| 2004/0254658 A1 | 12/2004 | Sherriff et al. |
| 2004/0260702 A1 | 12/2004 | Cragun et al. |
| 2005/0004911 A1 | 1/2005 | Goldberg et al. |
| 2005/0021397 A1 | 1/2005 | Cui et al. |
| 2005/0120080 A1 | 6/2005 | Weinreb et al. |
| 2005/0183005 A1 | 8/2005 | Denoue et al. |
| 2005/0226473 A1 | 10/2005 | Ramesh |
| 2005/0278286 A1 | 12/2005 | Djugash et al. |
| 2006/0004740 A1 | 1/2006 | Dettinger et al. |
| 2006/0070046 A1 | 3/2006 | Balakrishnan et al. |
| 2006/0074967 A1 | 4/2006 | Shaburov |
| 2006/0080616 A1 | 4/2006 | Vogel et al. |
| 2006/0116991 A1 | 6/2006 | Calderwood |
| 2006/0129992 A1 | 6/2006 | Oberholtzer et al. |
| 2006/0142949 A1 | 6/2006 | Helt |
| 2006/0209085 A1 | 9/2006 | Wong et al. |
| 2006/0271838 A1 | 11/2006 | Carro |
| 2006/0271884 A1 | 11/2006 | Hurst |
| 2006/0288046 A1 | 12/2006 | Gupta et al. |
| 2007/0005582 A1 | 1/2007 | Navratil et al. |
| 2007/0027851 A1 | 2/2007 | Kruy et al. |
| 2007/0094248 A1 | 4/2007 | Mcveigh et al. |
| 2007/0113164 A1 | 5/2007 | Hansen et al. |
| 2007/0150805 A1 | 6/2007 | Misovski |
| 2007/0168336 A1 | 7/2007 | Ransil et al. |
| 2007/0178501 A1 | 8/2007 | Rabinowitz et al. |
| 2007/0192281 A1 | 8/2007 | Cradick et al. |
| 2007/0260582 A1 | 11/2007 | Liang |
| 2008/0126344 A1 | 5/2008 | Hoffman et al. |
| 2008/0126951 A1 | 5/2008 | Sood et al. |
| 2008/0155440 A1 | 6/2008 | Trevor et al. |
| 2008/0196016 A1 | 8/2008 | Todd |
| 2008/0201313 A1 | 8/2008 | Dettinger et al. |
| 2008/0215543 A1 | 9/2008 | Huang et al. |
| 2008/0267386 A1 | 10/2008 | Cooper |
| 2009/0006150 A1 | 1/2009 | Prigge et al. |
| 2009/0007056 A1 | 1/2009 | Prigge et al. |
| 2009/0043762 A1 | 2/2009 | Shiverick et al. |
| 2009/0055487 A1 | 2/2009 | Moraes et al. |
| 2009/0083275 A1 | 3/2009 | Jacob et al. |
| 2009/0094217 A1 | 4/2009 | Dettinger et al. |
| 2009/0144747 A1 | 6/2009 | Baker |
| 2009/0161147 A1 | 6/2009 | Klave |
| 2009/0172674 A1 | 7/2009 | Bobak et al. |
| 2009/0187556 A1 | 7/2009 | Ross et al. |
| 2009/0193012 A1 | 7/2009 | Williams |
| 2009/0199047 A1 | 8/2009 | Vaitheeswaran et al. |
| 2009/0248721 A1 | 10/2009 | Burton et al. |
| 2009/0282068 A1 | 11/2009 | Shockro et al. |
| 2009/0299830 A1 | 12/2009 | West et al. |
| 2010/0011282 A1 | 1/2010 | Dollard et al. |
| 2010/0070464 A1 | 3/2010 | Aymeloglu et al. |
| 2010/0073315 A1 | 3/2010 | Lee et al. |
| 2010/0082671 A1 | 4/2010 | Li et al. |
| 2010/0145902 A1 | 6/2010 | Boyan et al. |
| 2010/0161646 A1 | 6/2010 | Ceballos et al. |
| 2010/0169376 A1 | 7/2010 | Chu |
| 2010/0169405 A1 | 7/2010 | Zhang |
| 2010/0199167 A1 | 8/2010 | Uematsu et al. |
| 2010/0313119 A1 | 12/2010 | Baldwin et al. |
| 2011/0035396 A1 | 2/2011 | Merz et al. |
| 2011/0041084 A1 | 2/2011 | Karam |
| 2011/0066497 A1 | 3/2011 | Gopinath et al. |
| 2011/0074811 A1 | 3/2011 | Hanson et al. |
| 2011/0093490 A1 | 4/2011 | Schindlauer et al. |
| 2011/0131547 A1 | 6/2011 | Elaasar |
| 2011/0145401 A1 | 6/2011 | Westlake |
| 2011/0153667 A1 | 6/2011 | Parmenter et al. |
| 2011/0208822 A1 | 8/2011 | Rathod |
| 2011/0252282 A1 | 10/2011 | Meek et al. |
| 2011/0258216 A1 | 10/2011 | Supakkul et al. |
| 2011/0270871 A1 | 11/2011 | He et al. |
| 2011/0321008 A1 | 12/2011 | Jhoney et al. |
| 2012/0078595 A1 | 3/2012 | Balandin et al. |
| 2012/0102022 A1 | 4/2012 | Miranker et al. |
| 2012/0159449 A1 | 6/2012 | Arnold et al. |
| 2012/0173381 A1 | 7/2012 | Smith |
| 2012/0174057 A1 | 7/2012 | Narendra et al. |

(56) References Cited

U.S. PATENT DOCUMENTS

| | | |
|---|---|---|
| 2012/0188252 A1 | 7/2012 | Law |
| 2012/0284719 A1 | 11/2012 | Phan et al. |
| 2013/0024268 A1 | 1/2013 | Manickavelu |
| 2013/0024731 A1 | 1/2013 | Shochat et al. |
| 2013/0054551 A1 | 2/2013 | Lange |
| 2013/0086482 A1 | 4/2013 | Parsons |
| 2013/0096968 A1 | 4/2013 | Van Pelt et al. |
| 2013/0198624 A1 | 8/2013 | Aymeloglu et al. |
| 2013/0225212 A1 | 8/2013 | Khan |
| 2013/0226944 A1 | 8/2013 | Baid et al. |
| 2013/0232220 A1 | 9/2013 | Sampson |
| 2014/0012886 A1 | 1/2014 | Downing et al. |
| 2014/0074888 A1 | 3/2014 | Potter et al. |
| 2014/0108074 A1 | 4/2014 | Miller et al. |
| 2014/0115589 A1 | 4/2014 | Marinelli, III et al. |
| 2014/0115610 A1 | 4/2014 | Marinelli, III et al. |
| 2014/0214579 A1 | 7/2014 | Shen et al. |
| 2014/0244388 A1 | 8/2014 | Manouchehri et al. |
| 2015/0112641 A1 | 4/2015 | Faraj |
| 2015/0269030 A1 | 9/2015 | Fisher et al. |
| 2016/0026923 A1 | 1/2016 | Erenrich et al. |
| 2018/0314711 A1 | 11/2018 | Botner et al. |
| 2018/0314883 A1 | 11/2018 | Saurav et al. |

FOREIGN PATENT DOCUMENTS

| | | | |
|---|---|---|---|
| EP | 2634745 | A1 | 9/2013 |
| EP | 2743839 | A1 | 6/2014 |
| EP | 2778986 | A1 | 9/2014 |
| EP | 2921975 | A1 | 9/2015 |
| GB | 2366498 | A | 3/2002 |
| GB | 2508503 | B | 1/2015 |
| GB | 2508293 | B | 4/2015 |
| HK | 1194178 | A1 | 9/2015 |
| NZ | 616212 | A | 1/2015 |
| NZ | 622485 | B1 | 3/2015 |
| NZ | 616299 | A | 4/2015 |
| WO | 200034895 | A1 | 6/2000 |
| WO | 2010030917 | A2 | 3/2010 |
| WO | 2010125256 | A1 | 11/2010 |
| WO | 2013030595 | A1 | 3/2013 |

OTHER PUBLICATIONS

Chazelle et al., "The Bloomier Filter: An Efficient Data Structure for Static Support Lookup Tables," SODA '04 Proceedings of the Fifteenth Annual ACM-SIAM Symposium on Discrete Algorithms, 2004, pp. 30-39.

Jacques, M., "An extensible math expression parser with plug-ins," Code Project, Mar. 13, 2008. Retrieved on Jan. 30, 2015 from the internet: <http://www.codeproject.com/Articles/7335/An-extensible-math-expression-parser-with-plug-ins>.

Ivanova et al., "An Architecture for Recycling Intermediates in a col. Store," Proceedings of the 35th Sigmod International Conference on Management of Data, Sigmod '09, Jun. 29, 2009, p. 309.

Russell et al., "NITELIGHT: A Graphical Tool for Semantic Query Construction," 2008, p. 10.

Donjerkovic et al., "Probabilistic Optimization of Top N Queries," Proceedings of the 25th VLDB Conference, Edinburgh, Scotland, 1999, pp. 411-422.

Karp et al., "A Simple Algorithm for Finding Frequent Elements in Streams and Bags," ACM Transactions on Database Systems, vol. 28, No. 1, Mar. 2003, p. 51055.

Canese et al., "Chapter 2: PubMed: The Bibliographic Database," The NCBI Handbook, Oct. 2002, pp. 1-10.

Leela et al., "On Incorporating Iceberg Queries in Query Processors," Technical Report, TR-2002-01, Database Systems for Advanced Applications Lecture Notes in Computer Science, 2004, vol. 2973.

Kitts, Paul, "Chapter 14: Genome Assembly and Annotation Process," The NCBI Handbook, Oct. 2002, pp. 1-21.

Mendes et al., "TcruziKB: Enabling Complex Queries for Genomic Data Exploration," IEEE International Conference on Semantic Computing, Aug. 2008, pp. 432-439.

Alur et al., "Chapter 2: IBM InfoSphere DataStage Stages," IBM InfoSphere DataStage Data Flow and Job Design, Jul. 1, 2008, pp. 35-137.

Ballesteros et al., "Batching: A Design Pattern for Efficient and Flexible Client/Server Interaction," Transactions on Pattern Languages of Programming, Springer Berlin Heildeberg, 2009, pp. 48-66.

Mizrachi, Ilene, "Chapter 1: GenBank: The Nuckeotide Sequence Database," The NCBI Handbook, Oct. 2002, pp. 1-14.

Smart et al., "A Visual Approach to Semantic Query Design Using a Web-Based Graphical Query Designer," 16th International Conference on Knowledge Engineering and Knowledge Management (EKAW 2008), EAcitrezza, Catania, Italy, Sep. 29-Oct. 3, 2008, pp. 16.

Wollrath et al., "A Distributed Object Model for the Java System," Proceedings of the 2nd Conference on USENEX, Conference on Object-Oriented Technologies (COOTS), Jun. 17, 1996, pp. 219-231.

Kahan et al., "Annotea: an Open RDF Infrastructure for Shared Web Annotations", Computer Networks, Elsevier Science Publishers B.V., vol. 39, No. 5, dated Aug. 5, 2002, pp. 589-608.

Madden, Tom, "Chapter 16: The BLAST Sequence Analysis Tool," The NCBI Handbook, Oct. 2002, pp. 1-15.

A Tour of Pinboard, <http://pinboard.in/tour> as printed May 15, 2014 in 6 pages.

Stamos et al., "Remote Evaluation," Journal ACM Transactions on Programming Languages and Systems (TOPLAS) vol. 12, Issue 4, Oct. 1990, pp. 537-564.

Bogle et al., "Reducing Cross-Domain Call Overhead Using Batched Futures," SIGPLAN No. 29, 10 (Oct. 1994) pp. 341-354.

Goldstein et al., "Stacks Lazy Threads: Implementing a Fast Parallel Call," Journal of Parallel and Distributed Computing, Jan. 1, 1996, pp. 5-20.

Sirotkin et al., "Chapter 13: The Processing of Biological Sequence Data at NCBI," The NCBI Handbook, Oct. 2002, pp. 1-11.

Liu et al., "Methods for Mining Frequent Items in Data Streams: An Overview," Knowledge and Information Systems, vol. 26, No. 1, Jan. 2011, pp. 1-30.

Wikipedia, "Machine Code", p. 1-5, printed Aug. 11, 2014.

Bouajjani et al., "Analysis of Recursively Parallel Programs," PLDI09: Proceedings of the 2009 ACM Sigplan Conference on Programming Language Design and Implementation, Jun. 15-20, 2009, Dublin, Ireland, pp. 203-214.

Delcher et al., "Identifying Bacterial Genes and Endosymbiont DNA with Glimmer," BioInformatics, vol. 23, No. 6, 2007, pp. 673-679.

"A Quick Guide to UniProtKB Swiss-Prat & TrEMBL," Sep. 2011, pp. 2.

Bae et al., "Partitioning Algorithms for the Computation of Average Iceberg Queries," DaWak 2000, LNCS 1874, pp. 276-286.

Fang et al., "Computing Iceberg Queries Efficiently," Proceedings of the 24th VLDB Conference New York, 1998, pp. 299-310.

Anonymous, "Frequently Asked Questions about Office Binder 97," http ://web. archive. org/web/20100210112922/http://support. microsoft. com/kb/84314 7 printed Dec. 18, 2006 in 5 pages.

"The FASTA Program Package," fasta-36.3.4, Mar. 25, 2011, pp. 29.

Han et al., "Efficient Computation of Iceberg Cubes with Complex Measures," ACM Sigmod, May 21-24, 2001, pp. 1-12.

Frantisek et al., "An Architectural View of Distributed Objects and Components in CORBA, Java RMI and COM/DCOM," Software—Concepts & Tools, vol. 19, No. 1, Jun. 1, 1998, pp. 14-28.

Delicious, <http:/ /delicious.com/> as printed May 15, 2014 in 1 page.

"Java Remote Method Invocation: 7—Remote Object Activation," Dec. 31, 2010, retrieved from the internet Mar. 15, 2016 https://docs.oracle.com/javase/7 /docs/platform/rmi/spec/rmi-activation2. html.

(56) References Cited

OTHER PUBLICATIONS

Sigrist, et al., "PROSITE, a Protein Domain Database for Functional Characterization and Annotation," Nucleic Acids Research, 2010, vol. 38, pp. D161-D166.

INFERRING A DATASET SCHEMA FROM INPUT FILES

BENEFIT CLAIM

This application claims the benefit under 35 U.S.C. § 120 as Continuation of U.S. patent application Ser. No. 16/748,351, filed on Jan. 21, 2020, which is a Continuation of U.S. patent application Ser. No. 16/210,984, filed on Dec. 5, 2018, now U.S. Pat. No. 10,540,333, issued on Jan. 21, 2020, which is a Continuation of U.S. patent application Ser. No. 15/654,952, filed on Jul. 20, 2017, now U.S. Pat. No. 10,204,119, issued on Feb. 12, 2019, the entire contents of which are hereby incorporated by reference for all purposes as if fully set forth herein. Applicant hereby rescinds any disclaimer of claim scope in the prior applications or the prosecution history thereof and advises the USPTO that the claims in this application may be broader than any claim in the prior applications.

FIELD OF THE DISCLOSURE

The present disclosure relates to computer-implemented resource management systems. More specifically, the example embodiment(s) described below relate to generating at least one dataset schema based upon input data files.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Data processing systems often need to process complex data input files, such as comma separated value (CSV) files, extensible markup language (XML) files, text files, JavaScript Object Notation (JSON) files, and other types of files containing data that is to be stored an accessed through a data repository. Processing the data input files usually involves reading entries of the data input file into a data repository, such a columnar data store or a database.

To correctly read the data input file into the columnar data store or database, the server computer needs to apply a schema to the file. The schema identifies an encoding for the data in the file, which symbols in the data file are used to delimit lines or rows, which symbols in the data file are used to delimit columns, which information in the file is header information and excluded from the columns of the data file, and which types of data formats apply to different rows. Without at least the delimiter information, a server computer is unable to extract data from the data input file for storing in a structured manner. Without the data format type information, the server computer is unable to store the data in a manner that allows the data to be queried efficiently. For example, if a column is filled with only strings, a user is unable to perform a search against the column for values above or below a certain number.

Generally, a schema is identified by the user when a data input file is uploaded. This requires the user uploading the file to be aware of the schema that should be applied to the file and to convey that information to a server computer system. While some users may have the adequate technical experience required to understand the schema for an uploaded file and convey that information to a server computer, a system that requires users to understand the schema for an uploaded file inherently reduces the usability of the system such that only experts in file structure can upload files into a data repository system.

Alternative structures would require some type of uniformity in the creation of data input files. For instance, a system may require all file being uploaded to conform to a uniform schema or to include schema information in a header portion of the file. These alternative structures only work for the creation of files moving forward. Thus, the usability of a system that requires uniformity is greatly reduced as it would be unable to handle older files, files created through different applications, or files created by different users for different purposes.

Thus, there is a need for a system that infers a schema for a data input file using only the information stored in the data input file.

SUMMARY

The appended claims may serve to summarize the disclosure.

DETAILED DESCRIPTION

In the following description, for the purposes of explanation, numerous specific details are set forth in order to provide a thorough understanding of the present disclosure. It will be apparent, however, that embodiments may be practiced without these specific details. In other instances, well-known structures and devices are shown in block diagram form in order to avoid unnecessarily obscuring the present disclosure.

Embodiments are described in sections below according to the following outline:
General Overview
System Overview
Functional Overview
Row Delimiters
Column Delimiters
Headers
Data Format Types
Additional Embodiments
Interface
Validation and Errors
Implementation Example—Hardware Overview
Implementation Example—Basic Software System
Extensions and Alternatives

General Overview

Techniques for inferring a schema for a data input file are described herein. In an embodiment, a server computer system receives a data input file. The server computer system selects a subset of the file for performing the inference. The server computer system then analyzes the file to identify a row delimiter, a column delimiter, and a plurality of data types for the file. Additionally, the server computer system may analyze the file to identify encodings for the file and header information in the file. Using the identified row delimiter, column delimiter, and plurality of data types, the server computer system generates a candidate schema.

In an embodiment, a method comprises receiving a data input file; selecting a sample excerpt from the data input file, the sample excerpt comprising a subset of the data input file; analyzing the sample excerpt to determine a row delimiter for the data input file, the row delimiter comprising one or more symbols that delimit each particular row of a plurality of rows in the data input file; analyzing the sample excerpt to determine a column delimiter for the data input file, the column delimiter comprising one or more symbols that delimit each particular column of a plurality of columns in the data input file; analyzing the sample excerpt to determine a plurality of data format types, each particular data format type corresponding to a particular column of each particular column of the plurality of columns in the data input file; using the column delimiter, row delimiter, and plurality of data format types to generate a candidate schema for the data input file.

System Overview

Figure 1:
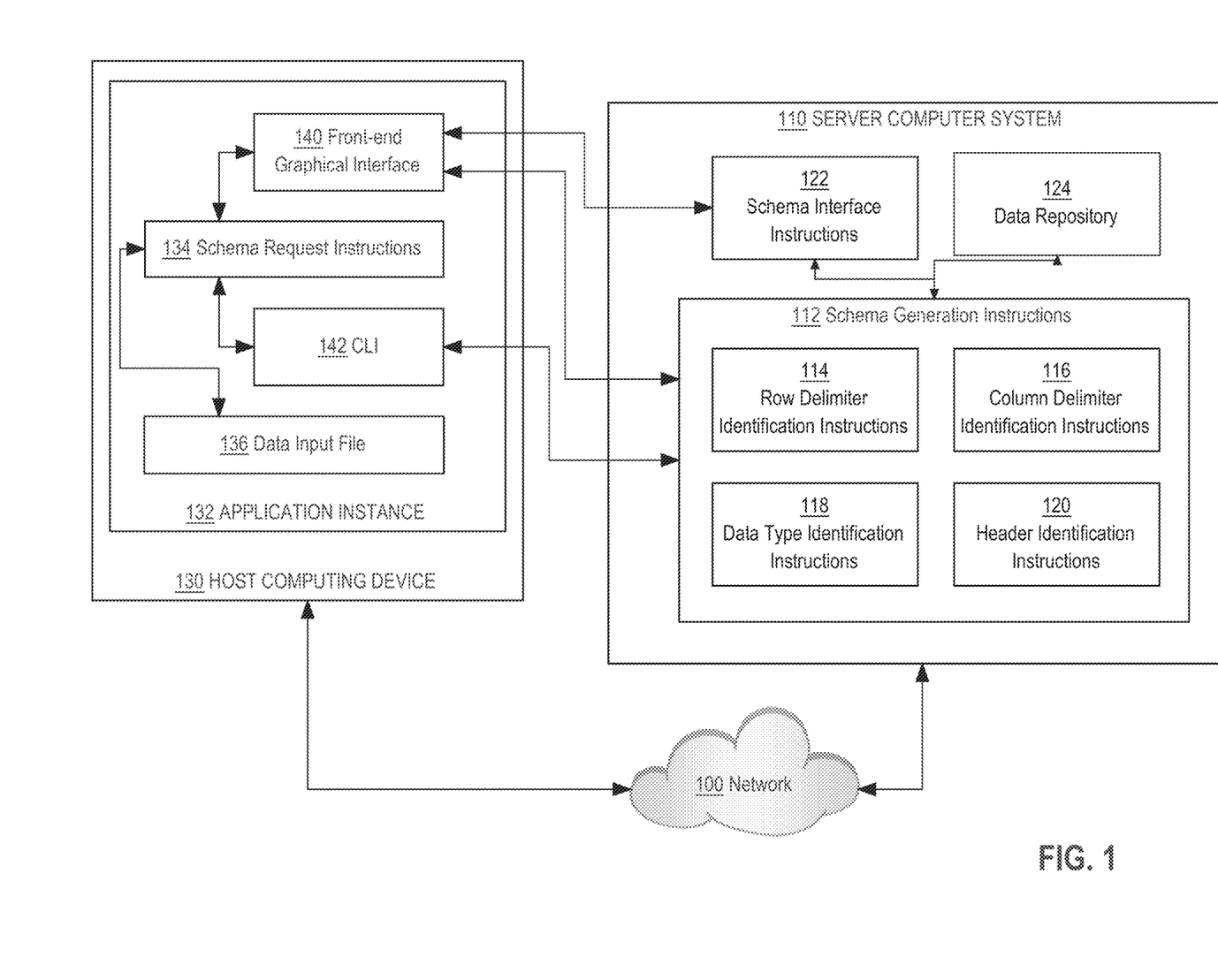
FIG. 1 depicts a schematic diagram of a distributed computing system for inferring a schema for a data input file.

FIG. 1 depicts a schematic diagram of a distributed computing system for inferring a schema for a data input file.

In an embodiment, a distributed computing system comprises a server computer ("server") 110 coupled via network 100 to a host computing device 130. The distributed computing environment can be within one or more data center, virtual computing facility or other hosting facilities connected to a network such as, for example, the Internet or other network; other embodiments can be within a networked home, office, or campus.

Network 100 broadly represents a combination of one or more local area networks, wide area networks, and/or internetworks and may include the public internet. The network 100 can connect multiple hosts 130 together within the distributed computing environment. Network 100 can be composed of multiple sub-networks that are connected. For example, the network 100 can be an Internet Protocol Version 4-based and/or an Internet Protocol Version 6-based wired or wireless network or a combination of multiple such networks.

Host computing device 130 broadly represents one or many computers and the number of hosts 130 in the system at a given time may vary in different embodiments and any number may be used. In an embodiment, a host 130 can be a single computing device such as, for example, the computing device 400 described below with respect to FIG. 4. Alternatively, a host 130 can be a single virtual computer instance that executes on a computing device facilitated by a virtualization layer interposed between the virtual computer instance and the computing device. The virtualization layer can be a virtual machine monitor such as, for example, virtual machine monitor 530 described below with respect to FIG. 5.

Regardless if a single computing device or a single virtual computer instance, a host 130 can be configured with an operating system such as, for example, operating system 510 described below with respect to FIG. 5. The operating system of a host 130 can manage low-level aspects of the host's operation including managing execution of processes, memory allocation, file input and output (I/O), and device I/O. Furthermore, the operating system of host 130 may manage presentation systems such as a windowed graphical user interface (GUI) and driving a computer display device such as a flat screen display or CRT. A host 130 may also be configured with a container system (e.g. the DOCKER container system) for running services within containers on the host's operating system.

Services that execute as processes on hosts in the distributed computing environment may be configured using the distributed configuration platform described herein or in application Ser. No. 15/284,959, filed Oct. 4, 2016, the entire contents of which is hereby incorporated by reference as if fully set forth herein.

In an embodiment, host 130 comprises an application instance 132 which allows one or more services to be deployed on host 130 from one or more server computing devices, such as server 110. In an embodiment, application instance 132 comprises schema request instructions 134, a front-end graphical interface 140 and a command-line interface (CLI) 142 that may interoperate to provide the functions that are described further herein. In an embodiment, the front-end interface 140 and CLI 142 are programmed or configured to interact with one or more server-side functional units of server computer 110 as further described. Host computing device 130 also stores data input file 146 using processes that are further described in other sections.

A service that application instance 132 facilitates or hosts can be a single instance of a software product or software application installed on at least one of the hosts 130. For example, a service might be a database server instance, a web server instance, or any other instance of a software product or a software application installed on one or more of the hosts 130. Multiple different services may be installed on the hosts 130 including multiple different services on the same host 130. For example, a service may be installed on multiple of the hosts 130 in a distributed, clustered, load balanced, or failover computing arrangement.

In an embodiment, server 110 comprises schema interface instructions 122, data repository 124, schema generation instructions 112, row delimiter identification instructions 114, column delimiter identification instructions 116, data type identification instructions 118, and header identification instructions 120 as further described. In an embodiment, schema interface instructions, when executed by one or more processors, cause the server computer system 110 to display, through the front-end graphical interface 140 in the application instance 132 on the host computing device 130, inferred schema information, schema editing options, and/or a sample of an inferred schema applied to a data input file.

In an embodiment, schema generation instructions 112, when executed by one or more processors, cause server computer system 110 to execute one or more of row delimiter identification instructions 114, column delimiter identification instructions 116, data type identification instructions 118, or header identification instructions 120 to generate an inferred schema for a data input file. In an embodiment, row delimiter identification instructions 114 causes the server computer system 110 to identify one or more symbols in the data input file and store data identifying the one or more symbols as row delimiters. In an embodiment, column delimiter identification instructions 116 causes the server computer system 110 to identify one or more symbols in the data input file and store data identifying the one or more symbols as column delimiters. Data type identification instructions 118, when executed by one or more processors, cause the server computer system 110 to identify data format types for one or more columns of the data input file. Header identification instructions 120, in an embodiment, cause the server computer system 110 to identify one or more lines of header data in the data input file.

In an embodiment data repository 124 comprises a distributed data storage system which stores one or more resources. The resources may comprise one or more of individual data files, folders, JSON blobs, rows in a database, user comments or flags, media files, build artifacts, and/or any other digital resource. Data repository 124 may be configured to store data input files as well as output files conforming to an inferred schema. The inferred schema may allow data files of different formats to each be stored in a similar format in data repository 124.

In an embodiment, each of schema interface instructions 122, schema generation instructions 112, row delimiter identification instructions 114, column delimiter identification instructions 116, data type identification instructions 118, and header identification instructions 120 comprises a set of one or more pages of main memory, such as RAM, in the server 110 into which executable instructions have been loaded and which when executed cause the server to perform the functions or operations that are described herein with reference to those modules. For example, the schema generation instructions 112 may comprise a set of pages in RAM that contain instructions which when executed cause performing the schema generation functions that are described herein.

The instructions may be in machine executable code in the instruction set of a CPU and may have been compiled based upon source code written in JAVA, C, C++, OBJECTIVE-C, or any other human-readable programming language or environment, alone or in combination with scripts in JAVASCRIPT, other scripting languages and other programming source text. The term "pages" is intended to refer broadly to any region within main memory and the specific terminology used in a system may vary depending on the memory architecture or processor architecture.

In another embodiment, each of schema interface instructions 122, schema generation instructions 112, row delimiter identification instructions 114, column delimiter identification instructions 116, data type identification instructions 118, and header identification instructions 120 also may represent one or more files or projects of source code that are digitally stored in a mass storage device such as non-volatile RAM or disk storage, in the server 110 or a separate repository system, which when compiled or interpreted cause generating executable instructions which when executed cause the server 110 to perform the functions or operations that are described herein with reference to those modules. In other words, the drawing figure may represent the manner in which programmers or software developers organize and arrange source code for later compilation into an executable, or interpretation into bytecode or the equivalent, for execution by the server 110.

Functional Overview

Figure 2:
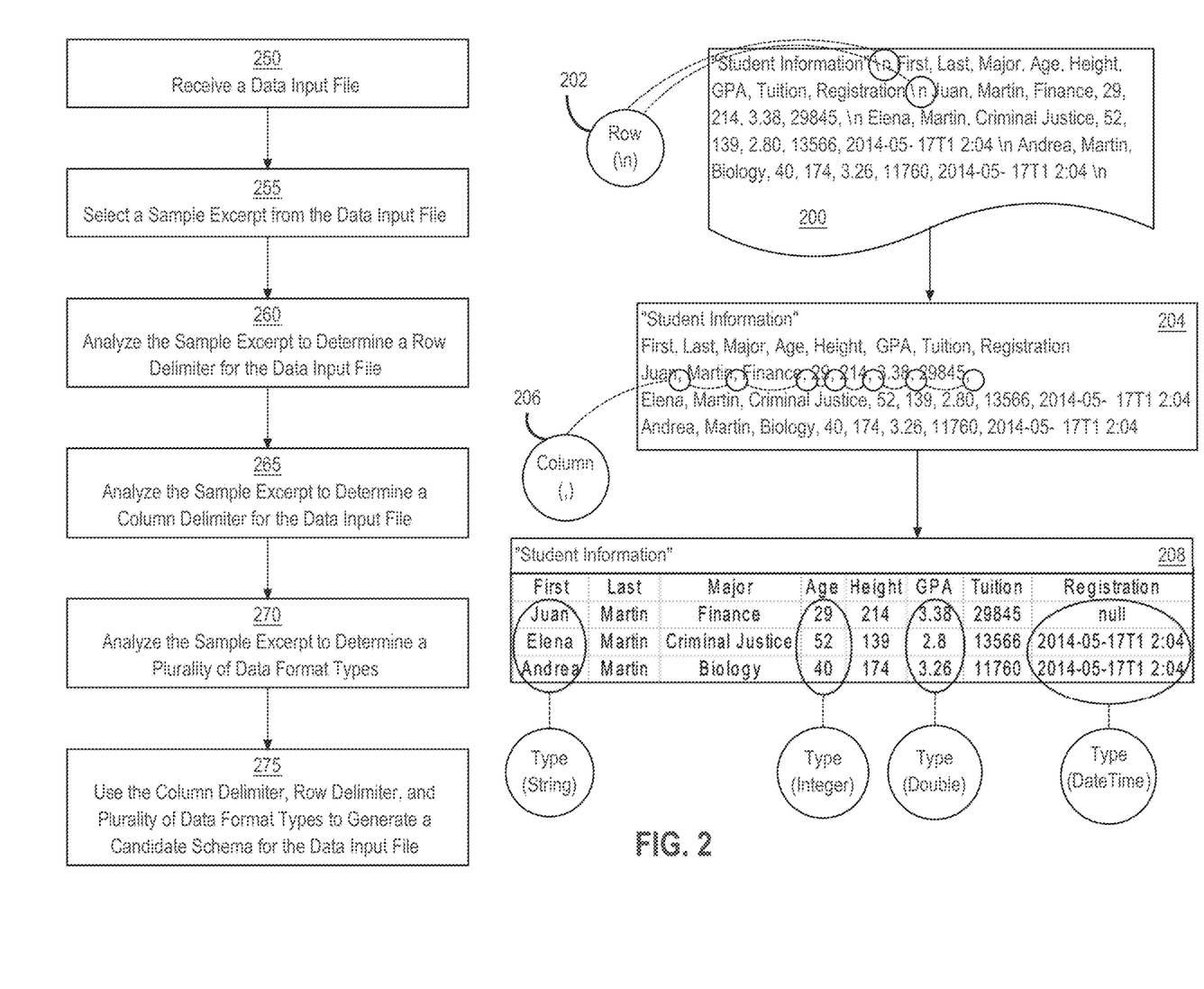
FIG. 2 depicts an example method of inferring a schema for a data input file.

FIG. 2 depicts an example method of inferring a schema for a data input file. FIG. 2 and any other flow diagram or process description in this disclosure is intended to represent an algorithm or plan for programming computer programs at the same level of detail that skilled persons in this field use to communicate among themselves about the architecture, process or data flow, arrangement, ordering and content of similar computer programs of similar types. That is, the flow diagrams and process descriptions are presented at a level of detail that skilled persons in this field have determined to be sufficient to communicate between themselves the baseline information that is adequate to permit the coding, completion, testing and deployment of computer programs that will execute and operate to provide the functions that are described herein.

At step 250, a data input file is received. For example, host computing device 130 may upload a data input file over network 100 to server computer system 110. Additionally or alternatively, host computing device may send data to server computer system 110 identifying one or more data input files stored in data repository 124 to be used as the data input file. In an embodiment, the server computer system 110 is programmed or configured to receive data input files of various formats including comma-separated files (CSV), MICROSOFT EXCEL files, APACHE PARQUET files, XML files, JSON blobs, text files, compressed text files, compressed comma-separated files, and/or any other file for storing tabular data. In an embodiment, the server computer system 110 may receive a plurality of data files in the same format. For example, the server computer system may receive several CSV files to be included in a single dataset.

In an embodiment, the server computer system 110 first determines whether the server computer system 110 is able to perform a schema inference on a file. For example, the server computer system 110 may store a blacklist of file types and a whitelist of file types. The blacklist of file types may identify file extensions for which the server computer system is unable to infer a schema. For example, the blacklist may identify movie or audiovisual media files such as .mov and .mp3 files. If the server computer system receives a .mov or .mp3 file, the server computer system may send an error to the host computing device identifying the file type as being not supported. Alternatively, the white list may identify known file extensions for which the server computer system can generate a schema. For example, the whitelist may identify known formats, such as .xml and .csv. If either a .xml or a .csv file is received, the server computer may proceed to infer a schema for the file.

In an embodiment, if a file extension is not identified by the blacklist or the whitelist, the server computer system 110 may determine whether the file is capable of being converted into a file on the whitelist. For example, the server computer system 110 may attempt to open the file using programs that access files with known extensions identified on the white list. The programs may treat the files as if they were formats that the programs are capable of opening. If a program successfully opens the file without returning an error, the server computer system may treat the file as if the file had the known extension used by the program.

In an embodiment, the server computer system 110 additionally infers a character encoding for the file. The character encoding, as used herein, refers to the patterns that represent a plurality of characters in a character set. For example, the server computer system 110 may store a library of different encodings in data repository 124. Additionally or alternatively, the server computer system may access an encoding library stored on a separate computing device. The server computer system may attempt to match patterns in the file to character encodings stored in the library. The server computer system may select an encoding that matches the highest percentage of patterns from the data input file.

At step 255, a sample excerpt from the data input file is selected. The server computer system may be programmed or configured to select a particular portion of each dataset, such as by a size of file and/or a number of rows in the data input file. For example, the server computer system may initially identify the row delimiter described in step 260. Using the row delimiter, the server computer system may identify a plurality of rows of a dataset stored in the data input file. The server computer system may be programmed or configured to select up to a stored maximum number of rows. For example, if the stored maximum number is three hundred, the server computer system may be programmed or configured to select the first three hundred rows of each data input file. If the data input file comprises less than three hundred rows, the server computer system may be programmed or configured to select the entire data input file as the sample excerpt.

At step 260, the sample excerpt is analyzed to determine a row delimiter for the data input file. As an example, FIG. 2 depicts sample excerpt 200 of a data input file. Sample excerpt 200 comprises data from a data input file. The server computer system analyzes the sample excerpt to identify a row delimiter. Methods for analyzing the data file to identify row delimiters are described further herein. In the example of FIG. 2, the server computer system identifies the row delimiter 202 as Unix row delimiter (\n).

At step 265, the sample excerpt is analyzed to determine a column delimiter for the data input file. For example, the server computer system may use the identified row delimiter 202 to separate the data in sample excerpt 200 into a plurality of sample rows 204. Sample rows 204 are separated as different lines based on the locations of the row delimiters. Thus, the first row comprises data prior to the first row delimiter, and the second row comprises data after the first row delimiter and prior to the second row delimiter. The server computer system may analyze the sample rows 204 to identify column delimiters within one or more of the sample rows. Methods for analyzing the sample rows to identify column delimiters are described further herein. In the example of FIG. 2, the server computer system identifies the column delimiter 206 as a comma (,).

At step 270, the sample excerpt is analyzed to determine a plurality of data format types. For example, the server computer system may use the column delimiter 206 to separate one or more of the plurality of rows into a plurality of columns 208. Some rows, such as the first header row, may be excluded from the plurality of columns 208. The server computer system may analyze data in each column to identify a type of data for the column. Methods for analyzing the columns to identify data format types are described further herein. In FIG. 2, the first column is analyzed to identify the data format type for the first column as a string type. The "Age" column is analyzed to identify the data format type for the "Age" column as an integer type. In an embodiment, header information is ignored in analyzing the columns for determining the format type. Methods for identifying header information in the sample excerpt are described further herein.

At step 275, the column delimiter, row delimiter, and plurality of data format types are used to generate a candidate schema for the data input file. The candidate schema comprises a schema for translating received files into rows and columns that may be stored in a database and/or a columnar data store. The candidate schema identifies row delimiters, column delimiters, and data format types for the columns of a data input file. The candidate schema may then be applied to the data input file to convert the data input file into a form that can be stored in the data repository of the server computer in an optimized manner. The server computer system may additionally display the candidate schema applied to the sample excerpt through a graphical user interface, thereby allowing a user to make edits to the candidate schema. Methods for validating and displaying the candidate schema are described further herein.

Row Delimiters

In an embodiment, the server computer system identifies row delimiters by using a row delimiter whitelist. The server computer system may store a row delimiter whitelist which comprises a plurality of candidate row delimiters. The plurality of candidate row delimiters includes one or more symbols that have been identified as possible row delimiters in the past. For example, the candidate row delimiters may include \n, \r, and \l. The server computer system may search for the first instance of a candidate row delimiter in the sample excerpt. Upon identifying a candidate row delimiter, the server computer system may determine whether there are more instances of the candidate row delimiter in the sample excerpt. If there are, the server computer system may select the candidate row delimiter as the row delimiter for the sample excerpt.

In an embodiment, the server computer system is programmed or configured to ignore quoted data in identifying a row delimiter for the sample excerpt. For example, the server computer system may search the file for a first instance of a candidate row delimiter or a quotation mark. Upon identifying a quotation mark, the server computer system may continue to search through sample excerpt until a second quotation mark is identified. Once a second quotation mark is identified, the server computer may search for the first instance of a candidate row delimiter or a quotation mark following the second quotation mark. This method may continue until the server computer system identifies a candidate row delimiter in the text. If no candidate row delimiter is identified in the text, the server computer system may search for variations of the candidate row delimiters, search for other symbols that may act as row delimiters, and/or send an error to the host computing device with a request to identify a row delimiter for the data input file.

Column Delimiters

In an embodiment, the server computer system identifies a plurality of candidate column delimiters in the sample excerpt. The server computer system may use one or more of a variety of techniques to identify the plurality of candidate column delimiters in the text. For example, the server computer system may store a whitelist of candidate column delimiters which identifies one or more symbols that may act as column delimiters. The server computer system may search through the sample excerpt for any of the candidate column delimiters. If the server computer system identifies more than one candidate column identifier in the text, the server computer system may employ digitally stored logic described further herein to select a particular candidate column identifier from the candidate column identifiers.

In an embodiment, the server computer system stores a blacklist of column delimiters which identifies one or more symbols that may not act as column delimiters. For example, the blacklist may identify alphanumeric symbols as symbols which do not act as column delimiters. The server computer system may search the sample excerpt for symbols that are not on the blacklist. Thus, if a set of characters includes only letters and/or numbers, the server computer system may identify no candidate column delimiters in the set of characters. Alternatively, if a set of characters includes numbers, letters, and non-alphanumeric symbols such as punctuation, the server computer system may identify the non-alphanumeric characters as candidate column delimiters.

In an embodiment, the server computer system uses both a whitelist of column delimiters and a blacklist of column delimiters to identify candidate column delimiters. For example, the server computer system may first search through one or more rows of the sample excerpt for any whitelisted column delimiters. If no whitelisted column delimiters are identified, the server computer system may search for any symbols that are not identified by the blacklist of column identifiers. As an example, the server computer system may first search for known column delimiters such as commas, pipe characters, and tabs. If the server computer system does not identify any commas, pipe characters, or tabs, the server computer system may broaden the search to include any non-alphanumeric symbols.

If the server computer system identifies more than one candidate column delimiter, the server computer system may identify the most consistent candidate column delimiter as the column delimiter for the data input file. For example, the server computer system may initially compute the total number of instances of each candidate column delimiter in each of a plurality of rows. The server computer system may identify, for each candidate column delimiter, a mode of the number of instance of the column delimiter in each of the plurality of rows. The mode, as used herein, refers to a number which appears most often in a set of numbers. For example, if the server computer system identifies five instances of commas in a first row, six instances of commas in a second row, and five instances of commas in a third and fourth row, the mode of instances of commas is five.

The server computer system may then compute a total deviation from the mode of instances of each candidate column delimiter. For example, in the above example, three of the rows comprise five commas while one row comprises six commas. The deviation for the row comprising six commas is one while there is no deviation for the rows comprising five commas. Thus, in those four rows, the total deviation is one. Additionally or alternatively, the server computer system may compute the number of rows which comprise a deviation from the mode. Thus, if the second row in the above example comprised only two commas, the server computer system may still identify the deviation as one, given that only one row of the four rows comprises a deviation from the mode.

Using the deviations from the mode, the server computer system may identify the candidate column delimiter with the lowest deviation from the mode as the column delimiter for the data input file. For example, if the server computer system identifies a deviation of five for commas and a deviation of two for tabs, the server computer system may identify tabs as the column delimiter. The server computer system may additionally store data rating the candidate column delimiters by likelihood in case multiple candidate column delimiters have the same deviation. For example, the data may identify tabs as more likely than periods, given that periods may be used in numeric values. Thus, if the server computer system determines that both tabs and periods have the same deviation from the mode, the server computer system may select tabs as the column delimiter.

Headers

The server computer system may identify header data in the sample excerpt. For example, if the sample excerpt includes a first portion of a data input file, the likelihood is the sample excerpt includes header data, such as a name of the document, names of the columns, or additional data stored with the document. Identifying the header data in the file can serve allows the server computer system to identify header information to a host computing device, improve the server computer's ability to identify column delimiters and data format types, and allow the server computer system to identify column names.

Identified header data may be removed from determinations of column delimiters and data format types. Given that some of the header information may not be broken up into columns, excluding the header data from the column delimiter identification may improve the performance of the server computer system in identifying column delimiters. Additionally, the header data may differ in type from data in the columns. For instance, an "Age" column may comprise integers, but the column name of "Age" comprises a string. Thus, removing the header data from the classification of data format types may improve the performance of the server computer in identifying data format types for the columns.

Identified header data may be used to identify names of columns in the data input file. For example, a header may include column names separated by column delimiters. After identifying the header data, the server computer system may search for a row of header data that includes column delimiters. In an embodiment, the server computer system searches for rows that have a same number of instances of a column delimiter as the mode of instances of the column delimiter in the non-header rows. By identifying a row in the header information with the same number of column delimiters as the majority of other rows, the server computer system ensures that the column names can be matched to individual columns. The server computer system may extract the column names from the identified row in the header.

In an embodiment, the server computer system identifies the header as the first line or row in the data input file. In other embodiments, the server computer system identifies the header as each line prior to the existence of a delimited numeric value. A delimited numeric value, as used herein, refers to a numeric value separated by column delimiters from other characters or symbols in the data input file. Numeric values may include any of integers, doubles, dates, and times. The server computer system may identify a first row in the sample excerpt that includes a delimited numeric value. The server computer system may determine that each row prior to the first row with a delimited numeric value contains header information. If none of the rows contain delimited numeric values, the server computer system may identify the first line or row in the data input file as header information.

Additionally or alternatively, the server computer system may identify the header as the information prior to uniformity of data format types of the columns. For example, the server computer may identify possible data format types for entries in each column. If the entries in the column, after a particular row, each comprise the same data type, the server computer system may identify the particular row and each prior row as header information. For example, if entries in a column comprise two strings followed by integers, the server computer system may identify the rows containing the string entries as header information.

Data Format Types

In an embodiment, the server computer system uses identified row delimiters and column delimiters to identify the plurality of data format types. For example, the server computer system may use the row delimiter to separate the sample excerpt into a plurality of rows. The server computer may additionally use the column delimiter to separate the sample excerpt into a plurality of columns. The server computer may then identify a data format for each column of the plurality of columns.

In an embodiment, the server computer additionally identifies header information in the data excerpt and excludes the header information from the determination of data format types. Additionally and/or alternatively, the server computer system may select a portion of the sample excerpt for identifying data format types that does not include a first predetermined number of rows. For example, the server computer system may skip the first ten rows of data in the sample excerpt when identifying data format types for the columns.

In an embodiment, the server computer system defaults the data format types for each column to a string type. Thus, if the server computer system is unable to identify a different data format type for a particular column, the server computer system may identify the data format type for the particular column as a string type.

The server computer system may identify data format types for columns in the sample excerpt by parsing entries in the column. The server computer system may begin with a plurality of candidate data format types and attempt to parse entries in the column using the candidate data format types. For example, the server computer may parse a first entry in the column as a Boolean, an integer, a double, a date, a time, a combination of date and time, or any other preset data format types. If the entry is unable to be parsed as a particular data format type, the particular data format type may be removed from the candidate data format types for that column. The server computer system may attempt to parse all entries of a plurality of entries in the column as each data format type. Additionally or alternatively, after identifying a threshold number of entries that cannot be parsed as a particular data format type, the server computer system may remove the particular data format type from the data format types used to parse entries.

The server computer system may identify a data format type for the row based on the server computer system's ability to parse the entries as the candidate data format types. For example, if the entries of a column do not parse as integers, the server computer system may determine that the data format type for the column is not an integer. In an embodiment, the server computer identifies only data format types that all of the entries in a column are able to be parsed as. Additionally or alternatively, the server computer system may store an error threshold. The error threshold may be a number, such as ten entries, or a percentage, such as ten percent of the entries. The server computer may ignore non-conforming entries if the number of non-conforming entries is less than the error threshold. Thus, if an error threshold is set at ten entries and the server computer system identifies only five entries of a column that cannot be parsed as an integer, the server computer system may ignore the five entries when determining a data format type for the column.

If the server computer system determines that the entries in a column can be parsed using a plurality of different data format types, the server computer system may select a data format type for the column using a hierarchy of data format types. The hierarchy, as used herein, refers to stored data that indicates preferable data format types. For example, the server computer system may store data indicating that date/time data format types are preferable to integer data format types which are preferable to double data format types, and so forth. Thus, if the server computer system determines that a column can be parsed as both a double and an integer, the server computer system may select the integer based on its placement in the hierarchy data.

The hierarchy may additionally identify preferable date formats. For example, the hierarchy may identify a date format of dd/mm/yy as preferable to mm/dd/yy. If a date cannot be parsed using the first format, then the server computer system may attempt to parse the date using the second format. For example, if one or more of the rows in a date column comprise a date value which would include a month value greater than twelve using the highest priority date format, the server computer system may determine that the date cannot be correctly parsed with highest priority date format and, in response, attempt to parse the date with the second highest priority date format.

The server computer system may resolve ambiguities with the year by selecting a year closest to a current date. For example, if the year is listed as two digits, the server computer system may determine a century based on which date is closest to the current date. Thus, if the year portion of the entry comprises "98" and a current year is 2017, the server computer system may identify the year as 1998 and not 2098. Alternatively, if the year portion of the entry comprises "20" and the current year is 2017, the server computer system may identify the year as 2020 and not 1920.

Interface

Figure 3:
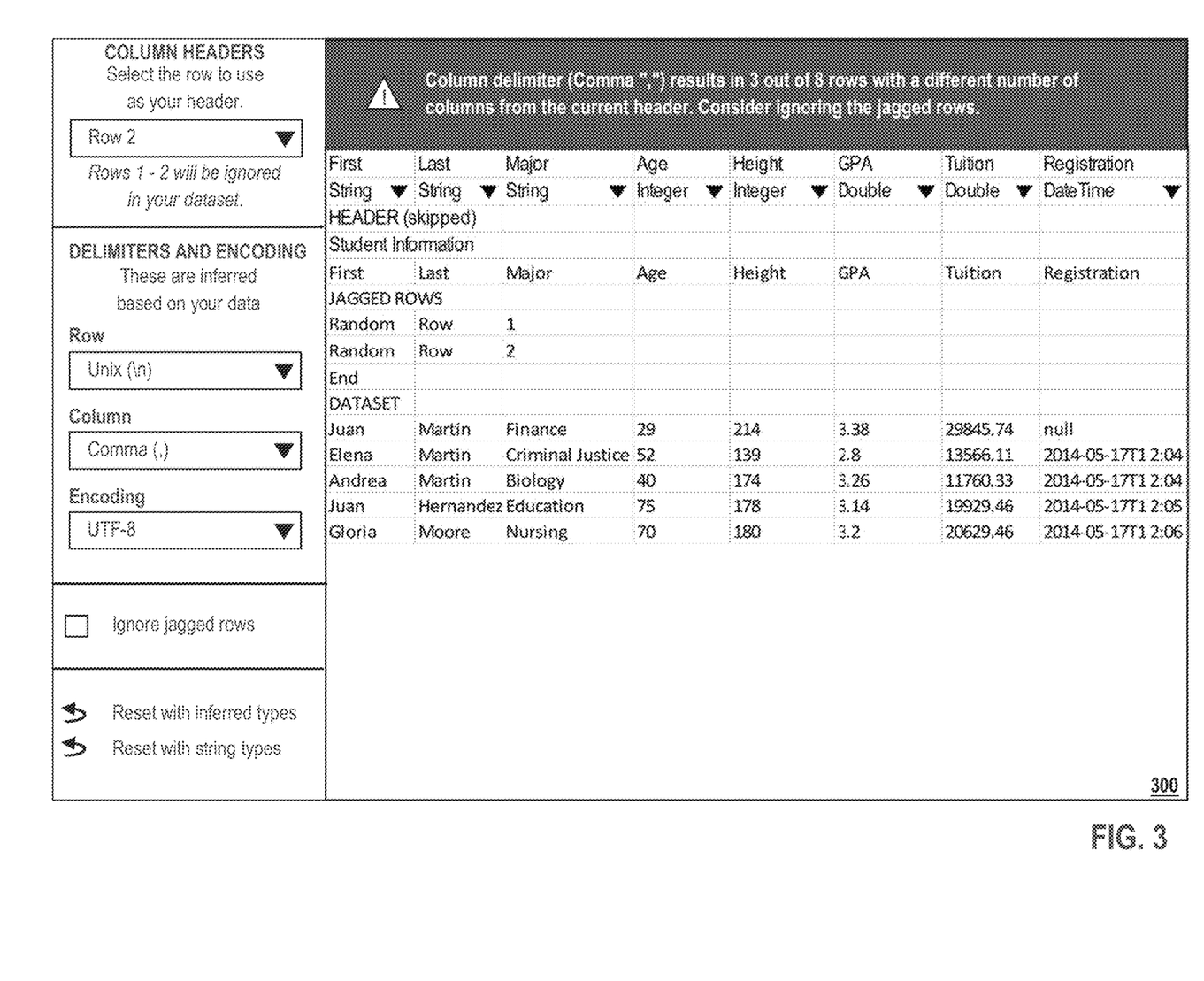
FIG. 3 depicts an example graphical user interface for displaying a candidate schema with a data input file.

After a candidate schema is identified for the data input file, the server computer system may display the candidate schema as applied to the sample excerpt of the data input file. FIG. 3 depicts an example graphical user interface for displaying a candidate schema with a data input file.

FIG. 3 comprises schema interface 300. Data in the interface of FIG. 3 is organized in a plurality of columns and a plurality of rows. Each of the columns comprises a column name either provided by the user through input into the graphical user interface or extracted from identified header data in a data input file. The columns also each comprise a data format type identified for the column using the methods described herein. For example, the column titled "First" is a string type while the column titled "Age" is an integer type. The format data types comprise drop down menus which can be used to edit the data format types for the candidate schema. For example, the drop-down menu for the "Age" column may be selected to change the data format type for the "Age" column from an integer value to a double value.

Schema interface 300 additionally includes options for editing the row delimiter, data encoding, column delimiter, and header identification. The header identification option allows the user to identify additional rows to be included in the header data or rows that were included as header data that are not to be included in the header data. The row delimiter and column delimiter options allow the user to identify different row delimiters or column delimiters respectively for the candidate schema.

Schema interface 300 includes an option for rerunning the schema inference method using changes made by the user. For example, if the user changes the row delimiter, the server computer system may reperform the schema inference described herein using the changed row delimiter as a restriction. Thus, the server computer may reidentify a column delimiter based on different rows and reidentify data types for the columns based on the different columns and rows. By allowing the user to create restrictions before reevaluating the data input file, the server computer system can ensure higher accuracy with the schema inferences when the server computer system incorrectly identifies row delimiters, column delimiters, data format types, encodings, and/or headers.

In an embodiment, schema interface 300 includes an option for rerunning the schema inference method using only string types. Upon receiving a selection of the option for rerunning the schema inference method using only string types, the server computer system may reidentify column delimiters, row delimiters, and/or headers for the sample excerpt. Instead of identifying data format types using the methods described above, the server computer system may set the data format types for each of the columns as strings.

Validation and Errors

In an embodiment, the server computer system validates the candidate schema with respect to the data input file and identifies any errors in applying the candidate schema to the data input file. Validation may be performed against the sample excerpt as well as either the input data file or an entire dataset comprising the input data file, thereby identifying any errors that may occur using the candidate schema. Identifying errors may include identifying data that does not conform to a data format type, identifying jagged rows in the data input file, and identifying effects of changes to the candidate schema. By performing a validation against the entire dataset, the server computer system is able to avoid errors that may occur when processing the dataset using other applications. Additionally, the server computer system may identify a source of errors which would be more difficult to identify if the error occurred while processing the dataset using other applications.

In an embodiment, the server computer system identifies entries that do not conform to the data format type for a particular file. For example, the server computer system may determine that a particular column comprises an integer data format type. The server computer system may additionally determine that one or more entries in the particular column cannot be parsed as an integer. The server computer system may identify the one or more rows and display them to the user. For example, the server computer system may copy the row and display it above the rest of the dataset, such as in an ERRORS section below the JAGGED ROWS section in interface 300. The server computer system may additionally highlight the entry that does not conform to the data format type for the file.

In an embodiment, the server computer system identifies jagged rows comprising rows with a different number of columns than the rest of the rows. For example, in interface 300, the server computer system identified three jagged rows, two of which comprise three columns and one of which comprises one column. The server computer system identifies the jagged rows prior to the dataset, thereby improving the displays ability to show variations to the user. The schema interface may additionally include an option for ignoring jagged rows. If the option to ignore jagged rows is selected when a request to rerun the schema interface is received, the server computer system may perform the steps of inferring the candidate schema while ignoring the jagged rows such as in the step of identifying data format types.

In an embodiment, the server computer system additionally includes validation warnings based on the candidate schema and/or changes to the candidate schema. For example, in FIG. 3, the schema interface 300 comprises a warning that selecting the comma as the column delimiter causes three rows to be identified as jagged rows. Other warnings may include identifying one or more entries that the server computer system would not be able to parse using a selected data format type.

In an embodiment, the server computer system allows a user to change data in the data input file through the schema interface 300. For example, if a column with a data format type of "Integer" includes an entry of "Twenty-Five", the user may select the entry and replace "Twenty-Five" with the number "25". In response to receiving the update to the entry in the schema interface, the server computer system may identify the corresponding location of the entry in the data input file and change the data in the corresponding location to match the changes made by the user. Thus, the schema interface 300 allows a user to correct errors in the data input file such as non-conformity of entries to desired data format types.

The schema interface 300 may additionally include options for correcting errors in the data input file that lead to errors in the schema interface. For example, the server computer system may identify a few jagged rows based on row delimiters that were accidentally place in the data input file instead of column delimiters. The schema interface 300 may include an option for displaying selected data in the data input file. Thus, if a user selects a jagged row, the server computer system may display the text in the data input file that led to the creation of the jagged row. The user may then add or remove row delimiters and/or column delimiters from the data input file. Upon saving the changed data input file, the server computer system may rerun one or more steps of the schema inference method with the changed data input file.

By displaying errors in the schema interface and displaying options that allow a user to make corrections to the data input file, the server computer system allows a user to correct errors in a data input file that may otherwise have gone unnoticed. Using the "Twenty-Five" example described above, an example schema interface may additionally identify the column as a string due to the inclusion of a string entry. If the user changes the column type to integer instead of string, the schema interface may display an error indicating that an entry in one row may not be able to be parsed using the new data format type. The interface may also display the row that cannot be parsed. In displaying this information, the server computer system identifies to the user the reason that the row was parsed as a string and allows the user to correct the error in the data input file.

In an embodiment, the schema interface additionally includes scores for the parsing of different data types. For example, a type score may identify a percentage of a column that can be parsed as a particular type. Thus, a type percentage may indicate that 99% of a column can be parsed as a number or that 85% of a column can be parsed as a date in the dd/mm/yy format. The schema interface may include type percentages for each column, thereby indicating to a user how each column is being parsed. Upon receiving a selection of a type percentage, the schema interface may display rows that were not able to be parsed as a particular type. For example, in response to receiving a selection of a 99% type score for parsing a particular column as numbers, the schema interface may display the 1% of rows that were not able to be parsed as numbers, thereby allowing a user to edit the values in the rows to allow them to be parsed correctly.

The schema interface may display additional statistics regarding the parsing of data and/or the identification of delimiters. For example, a histogram of data column type scores may indicate type scores for each data format type for a particular column. A histogram of aggregate data column type scores may indicate type scores for each data format type for each column.

Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
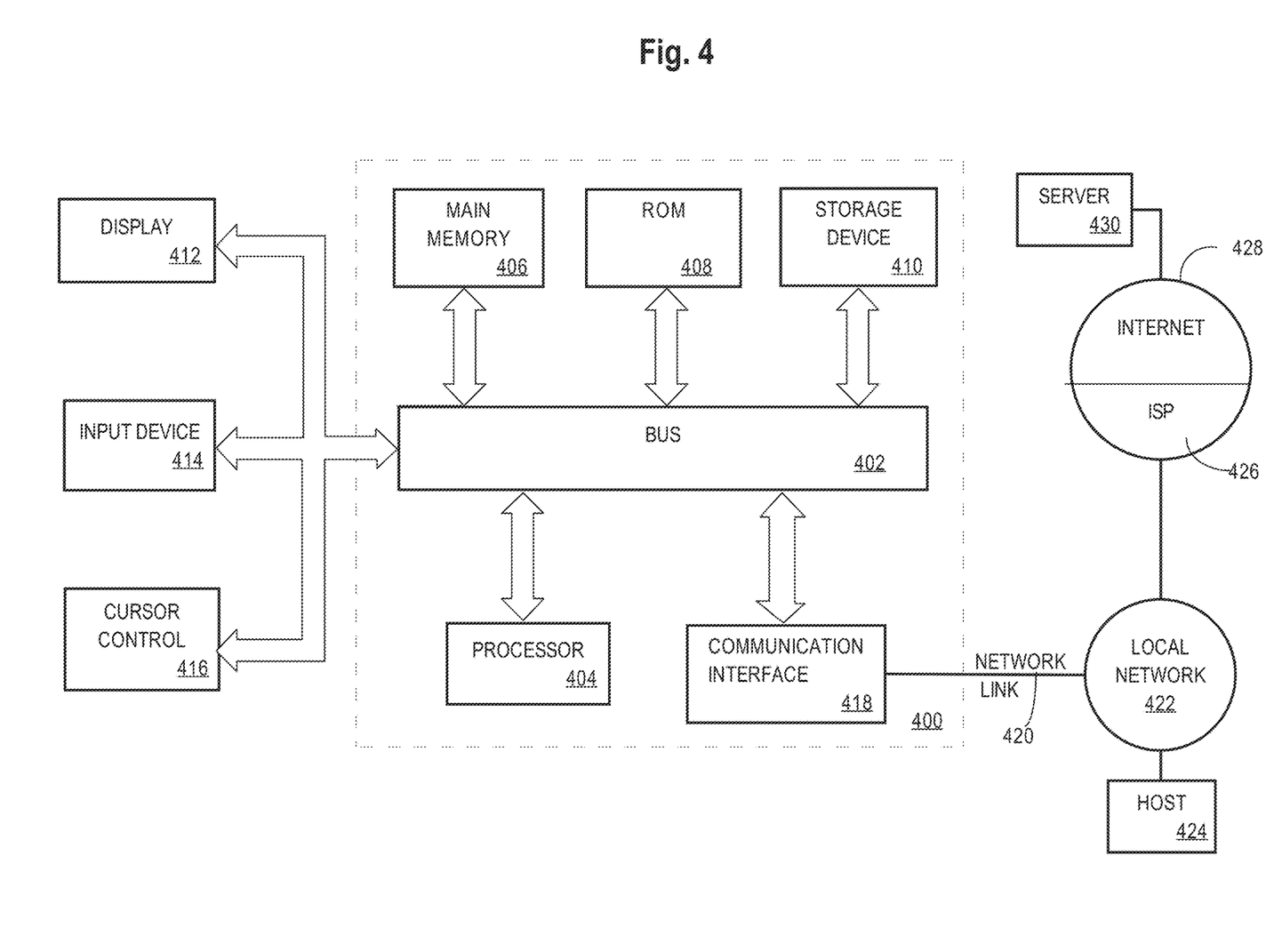
FIG. 4 is a block diagram that illustrates a computer system upon which an embodiment may be implemented.

For example, FIG. 4 is a block diagram that illustrates a computer system 400 upon which an embodiment may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

Implementation Example—Basic Software System

Figure 5:
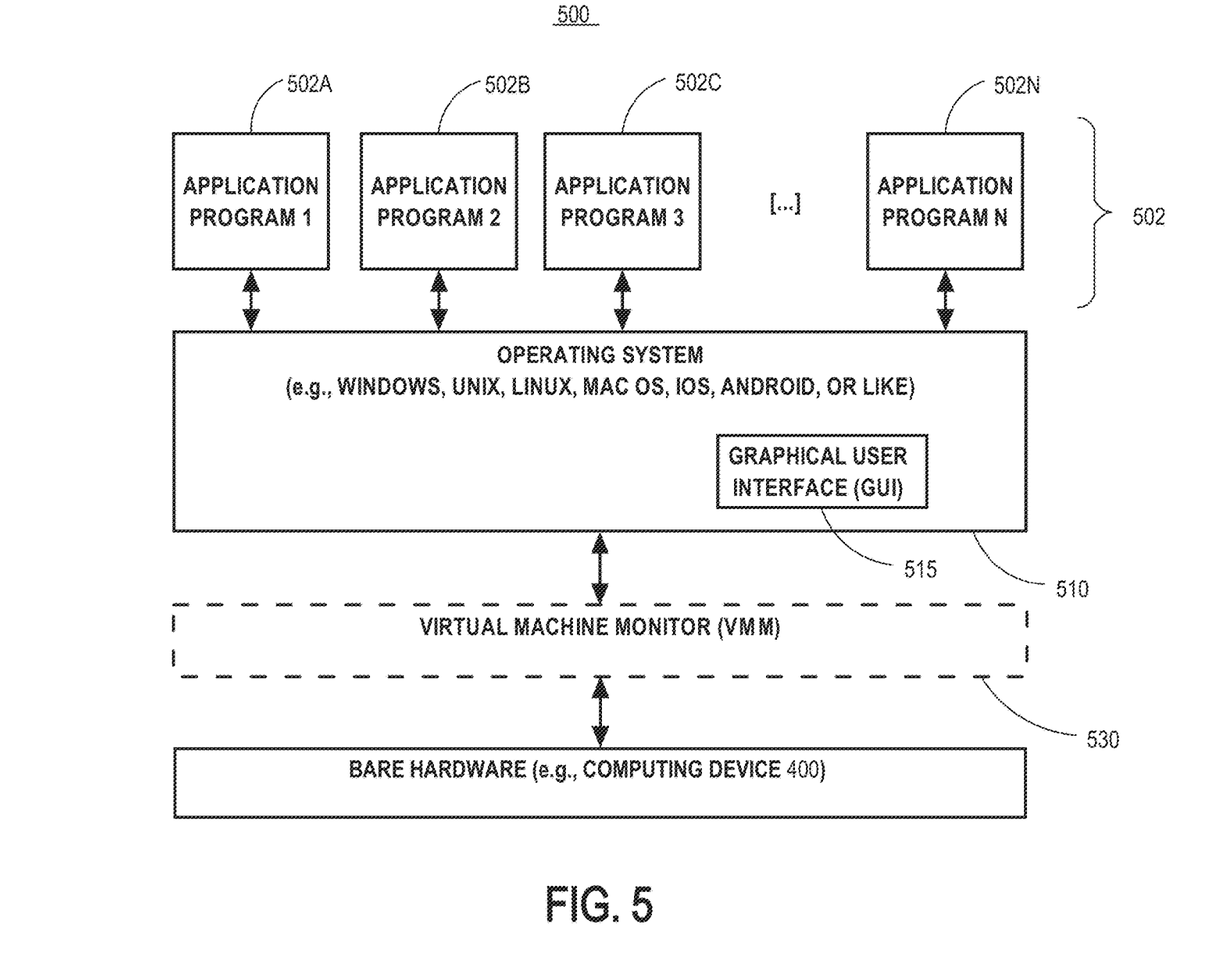
FIG. 5 is a block diagram of a basic software system that may be employed for controlling the operation of a computing device.

FIG. 5 is a block diagram of a basic software system 500 that may be employed for controlling the operation of computing device 400. Software system 500 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 500 is provided for directing the operation of computing device 400. Software system 500, which may be stored in system memory (RAM) 406 and on fixed storage (e.g., hard disk or flash memory) 410, includes a kernel or operating system (OS) 510.

The OS 510 manages low-level aspects of computer operation, including managing execution of processes, memory allocation, file input and output (I/O), and device I/O. One or more application programs, represented as 502A, 502B, 502C . . . 502N, may be "loaded" (e.g., transferred from fixed storage 410 into memory 406) for execution by the system 500. The applications or other software intended for use on device 500 may also be stored as a set of downloadable computer-executable instructions, for example, for downloading and installation from an Internet location (e.g., a Web server, an app store, or other online service).

Software system 500 includes a graphical user interface (GUI) 515, for receiving user commands and data in a graphical (e.g., "point-and-click" or "touch gesture") fashion. These inputs, in turn, may be acted upon by the system 500 in accordance with instructions from operating system 510 and/or application(s) 502. The GUI 515 also serves to display the results of operation from the OS 510 and application(s) 502, whereupon the user may supply additional inputs or terminate the session (e.g., log off).

OS 510 can execute directly on the bare hardware 520 (e.g., processor(s) 404) of device 400. Alternatively, a hypervisor or virtual machine monitor (VMM) 530 may be interposed between the bare hardware 520 and the OS 510. In this configuration, VMM 530 acts as a software "cushion" or virtualization layer between the OS 510 and the bare hardware 520 of the device 400.

VMM 530 instantiates and runs one or more virtual machine instances ("guest machines"). Each guest machine comprises a "guest" operating system, such as OS 510, and one or more applications, such as application(s) 502, designed to execute on the guest operating system. The VMM 530 presents the guest operating systems with a virtual operating platform and manages the execution of the guest operating systems.

In some instances, the VMM 530 may allow a guest operating system to run as if it is running on the bare hardware 520 of device 400 directly. In these instances, the same version of the guest operating system configured to execute on the bare hardware 520 directly may also execute on VMM 530 without modification or reconfiguration. In other words, VMM 530 may provide full hardware and CPU virtualization to a guest operating system in some instances.

In other instances, a guest operating system may be specially designed or configured to execute on VMM 530 for efficiency. In these instances, the guest operating system is "aware" that it executes on a virtual machine monitor. In other words, VMM 530 may provide para-virtualization to a guest operating system in some instances.

The above-described basic computer hardware and software is presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein. EXTENSIONS AND ALTERNATIVES In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A method comprising:
   receiving a data input file to be stored in a database, the data input file having unknown schema;
   selecting a sample excerpt from the data input file, the sample excerpt comprising a subset of the data input file;
   determining that a first row in the sample excerpt does not contain a delimited numeric value;
   determining that a second row in the sample excerpt following the first row does contain a delimited value;
   in response to the determining that the first row in the sample excerpt does not contain a delimited value and the second row in the sample excerpt does contain a delimited value, determining that the first row consists of header data for the data input file;
   identifying one or more jagged rows based on row delimiters that were erroneously placed in the sample excerpt instead of column delimiters;
   causing displaying, via a graphical user interface (GUI), text in the sample excerpt that led to creation of a jagged row of the one or more jagged rows;
   receiving, via the GUI, an addition or removal of a specific row delimiter of the row delimiters to the text;
   updating the sample excerpt based on the addition or the removal;

analyzing the sample excerpt to determine a row delimiter for the data input file, the row delimiter comprising one or more symbols that delimit each particular row in the data input file;

using the row delimiter, identifying a plurality of rows from the sample excerpt that is not included in the header data for the data input file;

identifying a plurality of candidate column delimiters in the sample excerpt;

using the plurality of candidate column delimiters and the row delimiter to generate a candidate schema for the data input file, wherein the method is performed using one or more processors.

2. The method of claim 1, further comprising:

receiving a second data input file;

selecting a second sample excerpt from the second data input file, the second sample excerpt comprising a subset of the second data input file;

receiving, via the GUI, a specification of a certain row in the second sample excerpt as containing certain header data;

ignoring all rows up to and including the certain row in the second sample excerpt in determining a row delimiter or a column delimiter for the second data input file.

3. The method of claim 1, further comprising receiving, via the GUI, a specification of an encoding for the data input file, the encoding being a pattern that represents a plurality of characters in a character set.

4. The method of claim 1, further comprising:

receiving, via the GUI, a request to rerun scheme inference using only string types;

re-identifying column delimiters for the sample excerpt by setting data format types for columns as strings.

5. The method of claim 1, further comprising:

determining that an entry in a column based on the candidate schema does not match a determined data type for the column;

causing a display, via the GUI, of a row containing the entry with an error message.

6. The method of claim 1, further comprising:

receiving, via the GUI, a specification of a certain column delimiter;

causing a display, via the GUI, of a warning that using the certain column delimiter causes a jagged row.

7. The method of claim 1, further comprising:

detecting that a column having an integer type contains a text version of an integer;

converting the text version to the integer for the column.

8. The method of claim 1, further comprising:

computing a score indicating a percentage of a column that can be processed as a certain data type;

causing a display, via the GUI, of rows for which the column cannot be processed as the certain data type.

9. The method of claim 1, further comprising:

using the candidate schema for the data input file, translating the data input file into a second plurality of rows and a plurality of columns;

storing, in the database, the second plurality of rows and the plurality of columns.

10. The method of claim 1, further comprising:

receiving, via the GUI, a second row delimiter for the data input file;

using the second row delimiter, identifying a second plurality of rows from the sample excerpt that is not included in the header data for the data input file;

identifying one or more second candidate column delimiters in the second plurality of rows;

using the one or more second candidate column delimiters and the second row delimiter to generate a second candidate schema for the data input file.

11. A system comprising:

a memory;

one or more processors coupled with the memory and configured to perform:

receiving a data input file to be stored in a database, the data input file having unknown schema;

selecting a sample excerpt from the data input file, the sample excerpt comprising a subset of the data input file;

determining that a first row in the sample excerpt does not contain a delimited numeric value;

determining that a second row in the sample excerpt following the first row does contain a delimited value;

in response to the determining that the first row in the sample excerpt does not contain a delimited value and the second row in the sample excerpt does contain a delimited value, determining that the first row consists of header data for the data input file;

identifying one or more jagged rows based on row delimiters that were erroneously placed in the sample excerpt instead of column delimiters;

causing displaying, via a graphical user interface (GUI), text in the sample excerpt that led to creation of a jagged row of the one or more jagged rows;

receiving, via the GUI, an addition or removal of a specific row delimiter of the row delimiters to the text;

updating the sample excerpt based on the addition or the removal;

analyzing the sample excerpt to determine a row delimiter for the data input file, the row delimiter comprising one or more symbols that delimit each particular row in the data input file;

using the row delimiter, identifying a plurality of rows from the sample excerpt that is not included in the header data for the data input file;

identifying a plurality of candidate column delimiters in the sample excerpt;

using the plurality of candidate column delimiters and the row delimiter to generate a candidate schema for the data input file.

12. The system of claim 11, the one or more processors further configured to perform:

receiving a second data input file;

selecting a second sample excerpt from the second data input file, the second sample excerpt comprising a subset of the second data input file;

receiving, via the GUI, a specification of a certain row in the second sample excerpt as containing certain header data;

ignoring all rows up to and including the certain row in the second sample excerpt in determining a row delimiter or a column delimiter for the second data input file.

13. The system of claim 11, the one or more processors further configured to perform receiving, via the GUI, a specification of an encoding for the data input file, the encoding being a pattern that represents a plurality of characters in a character set.

14. The system of claim 11, the one or more processors further configured to perform:

receiving, via the GUI, a request to rerun scheme inference using only string types;

re-identifying column delimiters for the sample excerpt by setting data format types for columns as strings.

15. The system of claim 11, the one or more processors further configured to perform:
   determining that an entry in a column based on the candidate schema does not match a determined data type for the column;
   causing a display, via the GUI, of a row containing the entry with an error message.

16. The system of claim 11, the one or more processors further configured to perform:
   receiving, via the GUI, a specification of a certain column delimiter;
   causing a display, via the GUI, of a warning that using the certain column delimiter causes a jagged row.

17. The system of claim 11, the one or more processors further configured to perform:
   detecting that a column having an integer type contains a text version of an integer;
   converting the text version to the integer for the column.

18. The system of claim 11, the one or more processors further configured to perform:
   computing a score indicating a percentage of a column that can be processed as a certain data type;
   causing a display, via the GUI, of rows for which the column cannot be processed as the certain data type.

19. The system of claim 11, the one or more processors further configured to perform:
   using the candidate schema for the data input file, translating the data input file into a second plurality of rows and a plurality of columns;
   storing, in the database, the second plurality of rows and the plurality of columns.

20. The system of claim 11, the one or more processors further configured to perform:
   receiving, via the GUI, a second row delimiter for the data input file;
   using the second row delimiter, identifying a second plurality of rows from the sample excerpt that is not included in the header data for the data input file;
   identifying one or more second candidate column delimiters in the second plurality of rows;
   using the one or more second candidate column delimiters and the second row delimiter to generate a second candidate schema for the data input file.

\* \* \* \* \*